US007233618B2

(12) United States Patent
Korotkov (10) Patent No.: US 7,233,618 B2
(45) Date of Patent: Jun. 19, 2007

(54) CIRCUIT CONFIGURATION AND METHOD FOR TRANSMITTING DIGITAL SIGNALS

(75) Inventor: Konstantin Korotkov, München (DE)

(73) Assignee: Infineon Technologies AG, Munich (DE)

( * ) Notice: Subject to any disclaimer, the term of this patent is extended or adjusted under 35 U.S.C. 154(b) by 776 days.

(21) Appl. No.: 10/423,812

(22) Filed: Apr. 25, 2003

(65) Prior Publication Data

US 2003/0215008 A1 Nov. 20, 2003

(30) Foreign Application Priority Data

Apr. 25, 2002 (DE) ................. 102 18 513

(51) Int. Cl.
*H03K 9/08* (2006.01)
(52) U.S. Cl. .................. 375/238; 375/295; 375/219; 375/222; 327/31; 370/205
(58) Field of Classification Search ............... 375/238, 375/219, 222, 257, 286, 288
See application file for complete search history.

(56) References Cited

U.S. PATENT DOCUMENTS 4,388,725 A * 6/1983 Saito et al. ............... 375/257
5,040,242 A * 8/1991 Tsuchiya et al. ............ 398/116
5,583,892 A * 12/1996 Drakul et al. ............... 375/353
6,256,557 B1 * 7/2001 Avila et al. ................... 701/1
6,657,566 B1 * 12/2003 Risbo et al. .................. 341/53
7,075,996 B2 * 7/2006 Simon et al. ............... 375/259

FOREIGN PATENT DOCUMENTS

| DE | 38 31 296 A1 | 4/1989 |
|---|---|---|
| JP | 09246973 | 9/1997 |

\* cited by examiner

*Primary Examiner*—Chieh M. Fan
*Assistant Examiner*—Siu M. Lee
(74) *Attorney, Agent, or Firm*—Laurence A. Greenberg; Werner H. Stemer; Ralph E. Locher (57) ABSTRACT

To transmit digital signals, binary signals are transformed into a series of pulses, the pulses being modulated in their pulse length as a function of an information content of the binary signals. In a corresponding circuit configuration, a modulation unit is connected to a first signal line for receiving the binary signals, the modulation unit transforming the received binary signals into the series of pulses and outputting them to a second signal line. In the process, a signal level of the pulses is also varied as a function of a state of one of the binary signals. By using a modulated pulse it is possible to transmit more than one data bit on a single data line during a clock cycle. This permits a comparatively high data throughput rate.

10 Claims, 6 Drawing Sheets

CIRCUIT CONFIGURATION AND METHOD FOR TRANSMITTING DIGITAL SIGNALS

BACKGROUND OF THE INVENTION

Field of the Invention

The present invention relates to a circuit configuration and to a method for transmitting digital signals.

A circuit configuration for transmitting digital signals is, for example, what is referred to as a memory controller that is connected to a data memory. The data memory is embodied, for example, as what is referred to as a Dynamic Random Access Memory (DRAM). The data memory contains, in particular, data that is accessed by the memory controller during a memory access. The electrical connection between the memory controller and the data memory is generally made through a bus system.

To increase the data throughput rate, there is a general tendency for memory controllers or microprocessors to be operated with increasing processing speeds, and, thus, also with increasing transmission frequencies. For this reason in particular, efforts are being made also to increase the processing speeds or the transmission frequency on the corresponding bus system to avoid restricting the overall performance of the system. However, this increase can, generally, lead to physical and/or electrical problems. In particular, in the case of relatively long bus systems to which a plurality of data memories are connected, it is possible for strong reflections and disruption of signals to be transmitted to arise as the transmission frequencies increase. These can adversely affect the signal quality and, thus, the detectability of the data to be transmitted. These reflections and faults are brought about, for example, by a multiplicity of connected data memories and the associated restricted possible ways of suitably adapting the electrical parameters and/or by limited electrical properties of the bus systems and of the connected data memories. Another possible way of increasing the data throughput rate when transmitting digital signals is to configure the bus system to transmit what are referred to as multilevel signals. Multilevel signals are, generally, signals with more than two voltage levels for representing logic states.

SUMMARY OF THE INVENTION

It is accordingly an object of the invention to provide a circuit configuration and method for transmitting digital signals that overcome the hereinafore-mentioned disadvantages of the heretofore-known devices and methods of this general type and by which a comparatively high data throughput rate is made possible while the detectability of the signals to be transmitted remains good.

With the foregoing and other objects in view, there is provided, in accordance with the invention, a circuit configuration for transmitting digital signals, including a first signal line for transmitting binary signals having states and information content, a second signal line, and a modulation unit connected to the first signal line and to the second signal line, the modulation unit transforming received binary signals into a series of pulses having respective pulse lengths and outputting the pulses to the second signal line, modulating the pulses in the pulse length as a function of the information content of the binary signals, and varying a signal level of the pulses that are to be output to the second signal line as a function of a state of one of the binary signals.

According to the invention, binary signals are transformed into a series of pulses in order to transmit digital signals, the pulses being modulated in their pulse length as a function of an information content of the binary signals. Correspondingly, the circuit configuration according to the invention has a first signal line for transmitting binary signals as well as a modulation unit that is connected to the first signal line. The modulation unit receives the binary signals of the first signal line and transforms them into a series of pulses and outputs them to a second signal line. The transformed pulses are modulated in their pulse length by the modulation unit as a function of an information content of the binary signals.

The invention makes possible a comparatively high data throughput rate while the detectability of the signals to be transmitted remains good because, by using a modulated pulse, it becomes possible to transmit more than one data bit on an individual signal line during a clock cycle or during a half clock cycle (in particular, in what is referred to as a DDR DRAM with double data rate). The modulated pulse signals can be received and evaluated by a receiver circuit. As the pulse length of the transmitted pulses is used to determine the information content of the transmitted data, signal level changes, for example, as a result of signal noise, are not so critical for the evaluation of the transmitted data as in conventional transmission systems. This provides the possibility of further increasing the transmission frequency in comparison with conventional transmission systems.

According to the invention, a signal level of the pulses is varied as a function of a state of one of the binary signals. In this way, the data transmission rate can be increased once more as, in addition to the pulse length of the modulated pulses, their signal level can also be used to evaluate the transmitted data. For example, as a function of a first state of one of the binary signals, a signal level of the modulated pulses is inverted in comparison with a transmission of the pulses due to a second state of one of the binary signals.

In accordance with another feature of the invention, there are provided a terminal for supplying a setting signal, the modulation unit having a driver circuit connected to the second signal line for outputting the pulses to the second signal line, the driver circuit having a setting input connected to the terminal and a resetting input, and a selection circuit connected to the first signal line, the selection circuit having an output connected to the resetting input, receiving a number of clock signals having edges are offset chronologically with respect to one another, receiving a number of the binary signals of the first signal line, and selecting one of the clock signals as a function of the information content of the number of binary signals to be passed onto the output of the selection circuit.

In accordance with a further feature of the invention, the modulation unit has a logic circuit component connected between the driver circuit and the output of the selection circuit, the logic circuit component is connected to the first signal line and is fed one of the binary signals, and the logic circuit component varies a signal level of the pulses that are to be output to the second signal line as a function of a state of one of the binary signals.

In accordance with an added feature of the invention, a receiver unit is provided that is connected to the second signal line. The receiver unit receives the pulses and integrates the pulse signals over time in each case to form an integrated signal, and decodes at least one binary signal from the integrated signal.

In accordance with an additional feature of the invention, the receiver unit has an integrator circuit connected to the second signal line and at which the integrated signal can be tapped and a comparator circuit for detecting the integrated signal, the comparator circuit supplying output signals, a decoder circuit connected to the comparator circuit for decoding binary signals from at least one of the output signals of the comparator circuit, and a sequence controller connected to the integrator circuit, the comparator circuit, and the decoder circuit, the sequence controller generating a number of control signals, a first of the control signals serving to trigger an integration process, a second of the control signals serving to reset the integrator circuit, and a third of the control signals serving to activate the comparator circuit and the decoder circuit.

In accordance with yet another feature of the invention, the receiver unit has a second comparator circuit detecting a signal level of pulses on the second signal line and supplying an output signal, the decoder circuit is connected to the second comparator circuit and decodes binary signals from the output signal of the second comparator circuit, and the sequence controller is connected to the second comparator circuit and generates a fourth control signal activating the second comparator circuit.

In accordance with yet a further feature of the invention, the sequence controller successively actuates the first control signal, the fourth control signal, the third control signal, and the second control signal for a decoding process.

In accordance with yet a further feature of the invention, there is provided a terminal supplying a reference voltage, the comparator circuit having a resistor series circuit connected to the terminal, the resistor series circuit having resistors with potentials, and respective potentials of individual ones of the resistors being tapped at the resistor series circuit to serve as reference potentials of the comparator circuit.

In accordance with yet an added feature of the invention, a terminal for a data reference signal is provided at the modulation unit and is connected to the receiver unit. The data reference signal serves, here, to synchronize the modulation unit and the receiver unit.

With the objects of the invention in view, there is also provided a method for transmitting digital signals, including the steps of transmitting digital signals by transforming binary signals into a series of pulses, modulating the pulses in pulse length as a function of an information content of the binary signals, and varying a signal level of the pulses as a function of a state of one of the binary signals.

Other features that are considered as characteristic for the invention are set forth in the appended claims.

Although the invention is illustrated and described herein as embodied in a circuit configuration and method for transmitting digital signals, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

In the figures of the drawings, unless stated otherwise, identical reference symbols denote identical parts.

Figure 1:
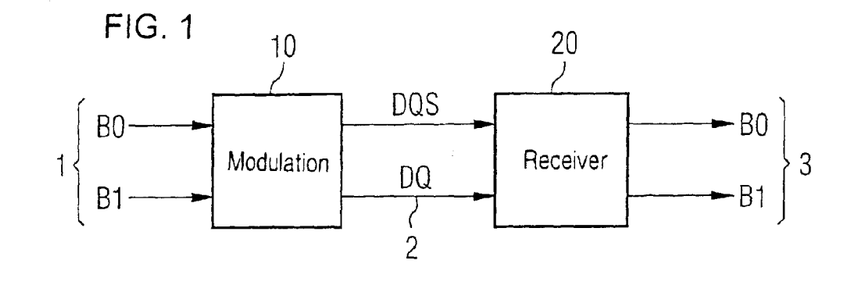
FIG. 1 is a block circuit diagram of an embodiment of a circuit configuration according to the invention.

Referring now to the figures of the drawings in detail and first, particularly to FIG. 1 thereof, there is shown an embodiment of a circuit configuration according to the invention for transmitting digital signals. A signal line 1 serves to transmit binary signals B0 and B1. The signal line 1 is connected to a modulation unit 10. A second signal line 2 is connected to the modulation unit 10 and to a receiver unit 20 that is, itself, connected to a signal line 3 for transmitting binary signals B0 and B1. The modulation unit 10 receives the binary signals B0 and B1 on the signal line 1 and transforms them into a series of pulses DQ, the pulses being modulated in their pulse length as a function of the information content of the binary signals B0 and B1. The receiver unit 20 receives the pulses DQ and has an integrator circuit that integrates the pulse signals over time in each case to form an integrated signal. The receiver unit also decodes the binary signals B0 and B1 on the signal line 3 from the integrated signal.

Figure 2:
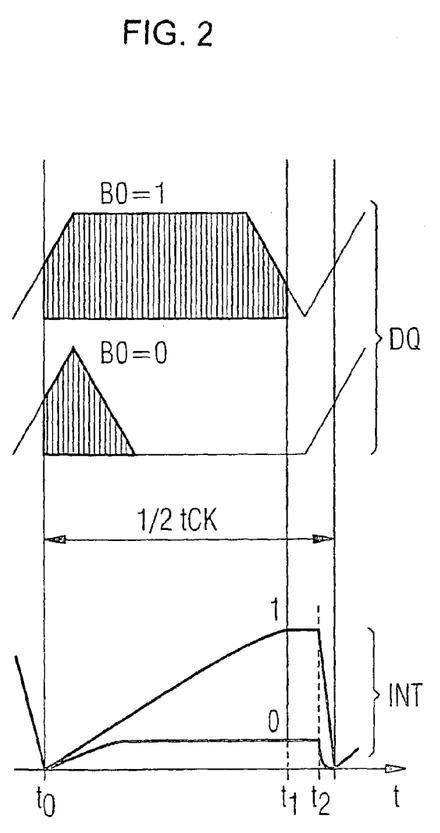
FIG. 2 is a set of signal diagrams illustrating the method according to the invention.
Figure 3:
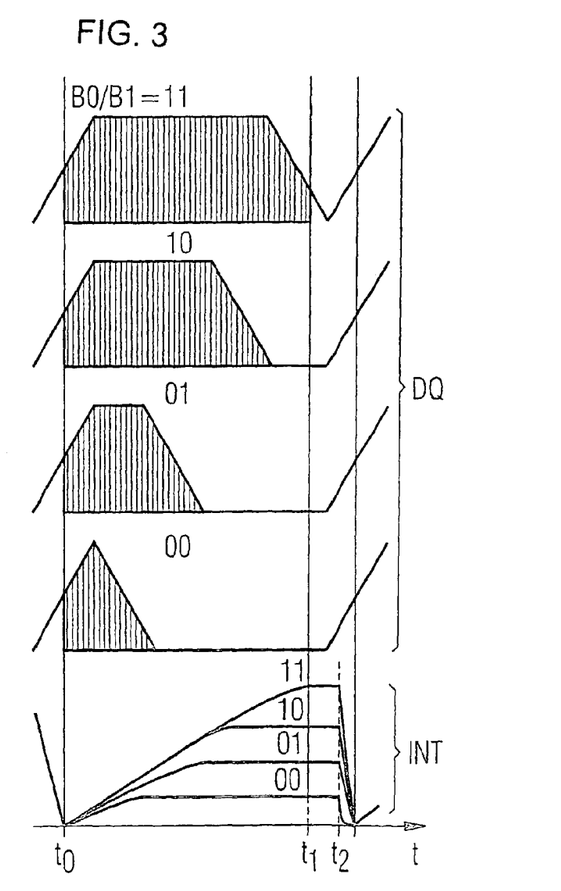
FIG. 3 is a set of signal diagrams illustrating another embodiment of the method according to the invention.

An exemplary signal diagram explaining this method for transmitting digital signals is shown in FIGS. 2 and 3. In FIG. 2 it is illustrated how the binary signal B0 with the state 1 is transformed into a corresponding pulse DQ with a modulated pulse length. In contrast thereto, a transformed pulse for the binary signal B0=0 has a shorter pulse length. The pulse signals are fed to the receiver unit 20 that integrates the pulse signals over time in each case to form an integrated signal INT. This corresponds to the hatched area of the respective pulse signals. At the time t0, the integration process is started. At the time t1, the integration process ends, the time t1 being defined, for example, as a function of a clock signal. This means that the pulse signals DQ are integrated during the defined time period t0 to t1. This time period is set as a function of the clock rate of the clock signal. At the time t2, the integrator circuit is reset into its initial state. In the time period between t1 and t2, the integrated signal INT is evaluated. If B0=1, the integrated signal INT has a higher signal level than when the pulse corresponding to the signal B0=0 is detected. FIG. 2 shows, by way of example, a data transmission with a DDR DRAM memory in which data is transmitted at every edge change of a clock signal. The data is correspondingly transmitted within a half clock period ½ tCK.

In FIG. 3, a signal diagram illustrating a method for transmitting digital signals is shown, in which diagram two data bits are transmitted within a half clock cycle (½ tCK). The four different possible states of the data bits are transmitted respectively by one pulse DQ with a modulated pulse length, the pulses differing in their pulse length depending on the state of the binary signals. In the present exemplary embodiment, the combination of the data bits B0/B1=11 is transformed into a pulse DQ with the greatest pulse length, and the combination of the data bits B0/B1=00 is transformed into a pulse DQ with the shortest pulse length. Accordingly, the integrated signal INT has four different signal levels at the time t1. Overall, the data throughput rate in the right-hand part of FIG. 2 is doubled without increasing the transmission frequency.

Figure 4:
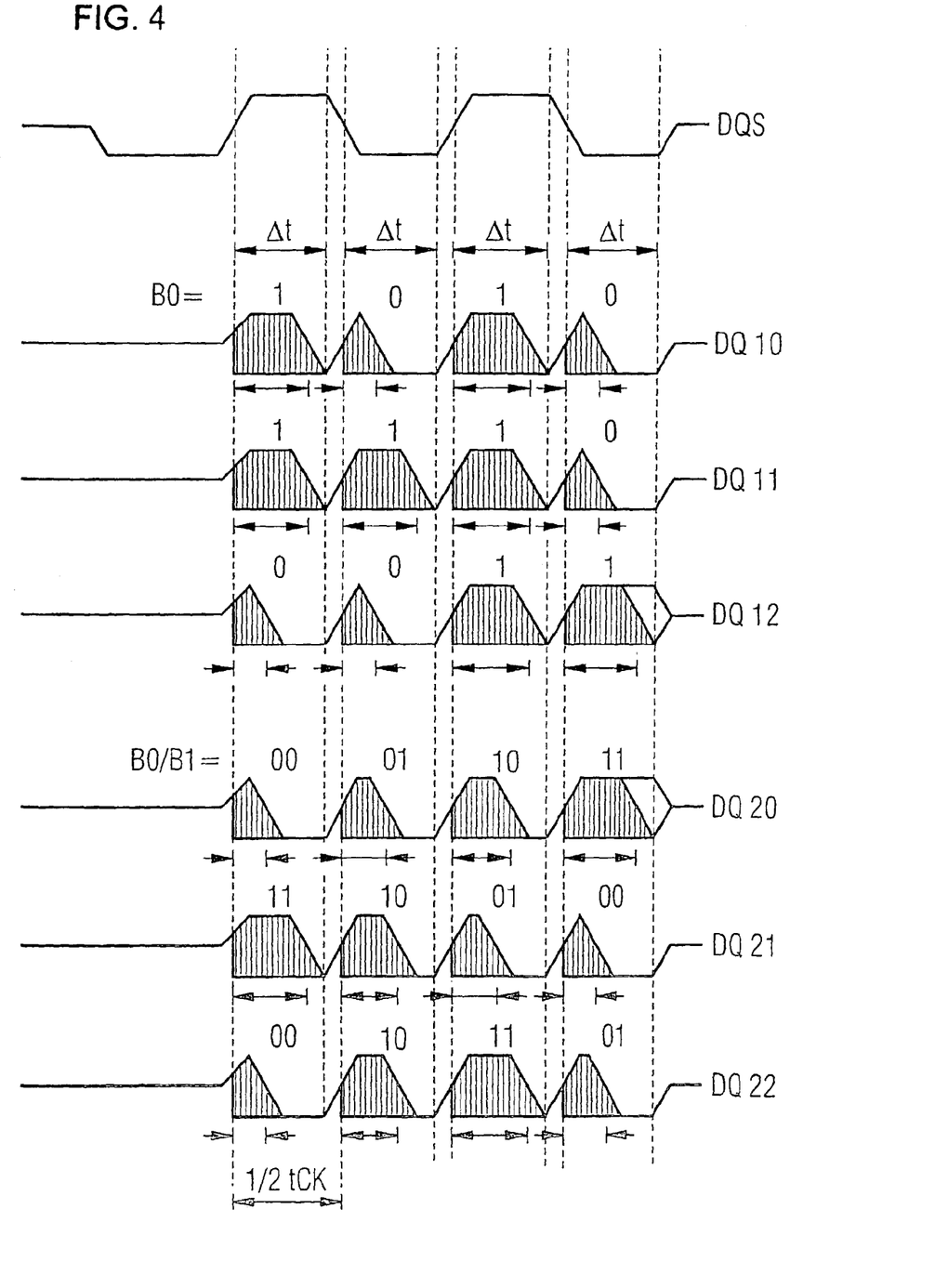
FIG. 4 is a set of signal diagrams illustrating a further exemplary embodiment of the method according to the invention.

FIG. 4 is a further exemplary signal diagram illustrating the method according to the invention. In the upper part of FIG. 4, in each case one-bit signals corresponding to the data bit B0 are transmitted during the half clock period ½ tCK. As illustrated with reference to the pulse signals DQ10 to DQ12, different pulse sequences are transmitted. In the lower part of FIG. 4, a signal transmission is illustrated in which two bits corresponding to the data bits B0, B1 are transmitted within a half clock period ½ tCK. The pulse signals DQ20 to DQ22 illustrate different signal sequences.

Figure 5:
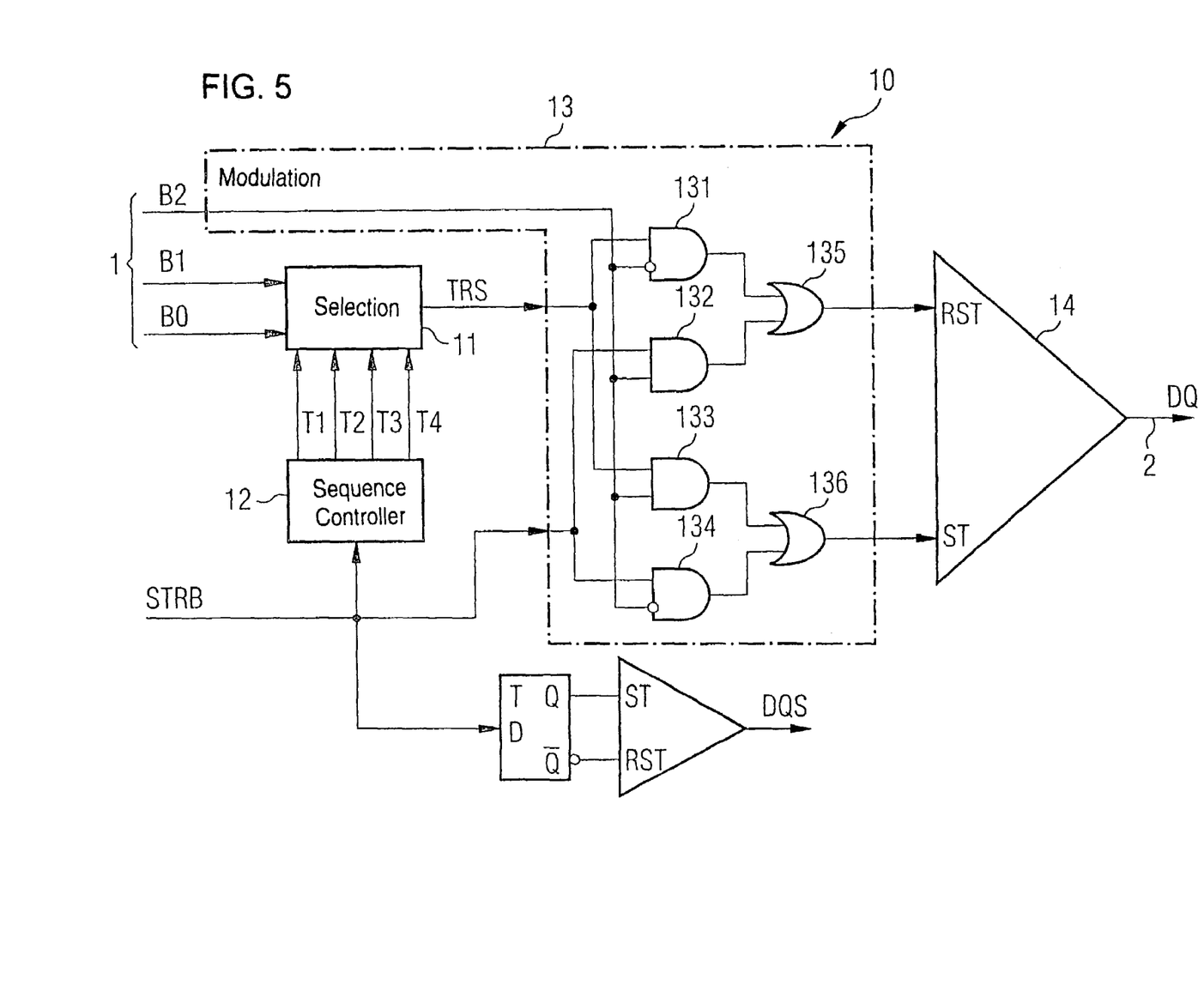
FIG. 5 shows an embodiment of a modulation unit according to the invention.

FIG. 5 illustrates an embodiment of a modulation unit according to the invention. The modulation unit 10 has a driver circuit 14 for outputting pulses DQ to the signal line 2. In addition, a selection circuit 11 is provided that receives the binary signals B0 and B1 of the signal line 1. In addition, the modulation unit 10 has a sequence controller 12 that generates clock signals T1 to T4 whose edges are offset chronologically with respect to one another, as illustrated, in particular, in FIG. 6. The selection circuit 11 receives the clock signals T1 to T4. In addition, a terminal is provided for a data reference signal DQS that is generated from the signal STRB by a D flip-flop and a driver and is used for the chronological synchronization of the modulation unit 10 with the receiver unit 20 from FIG. 1. Here, a DQS signal can be used for a plurality of DQ pulses. Assuming that the circuit component 13 is not provided at first, a resetting input RST of the driver circuit 14 is connected to the output of the selection circuit 11 at which the signal TRS is present. The setting input ST of the driver circuit 14 is connected to a terminal for the setting signal STRB in this case.

In addition, FIG. 5 illustrates a logic circuit component 13 that has AND gates 131 to 134 and OR gates 135 and 136. The circuit component 13 is connected between the driver circuit 14 and the output of the selection circuit 11. This circuit component 13 is necessary to vary, in the present exemplary embodiment invert, a signal level of a pulse that is to be output, as a function of a state of the binary signal B2.

Figure 6:
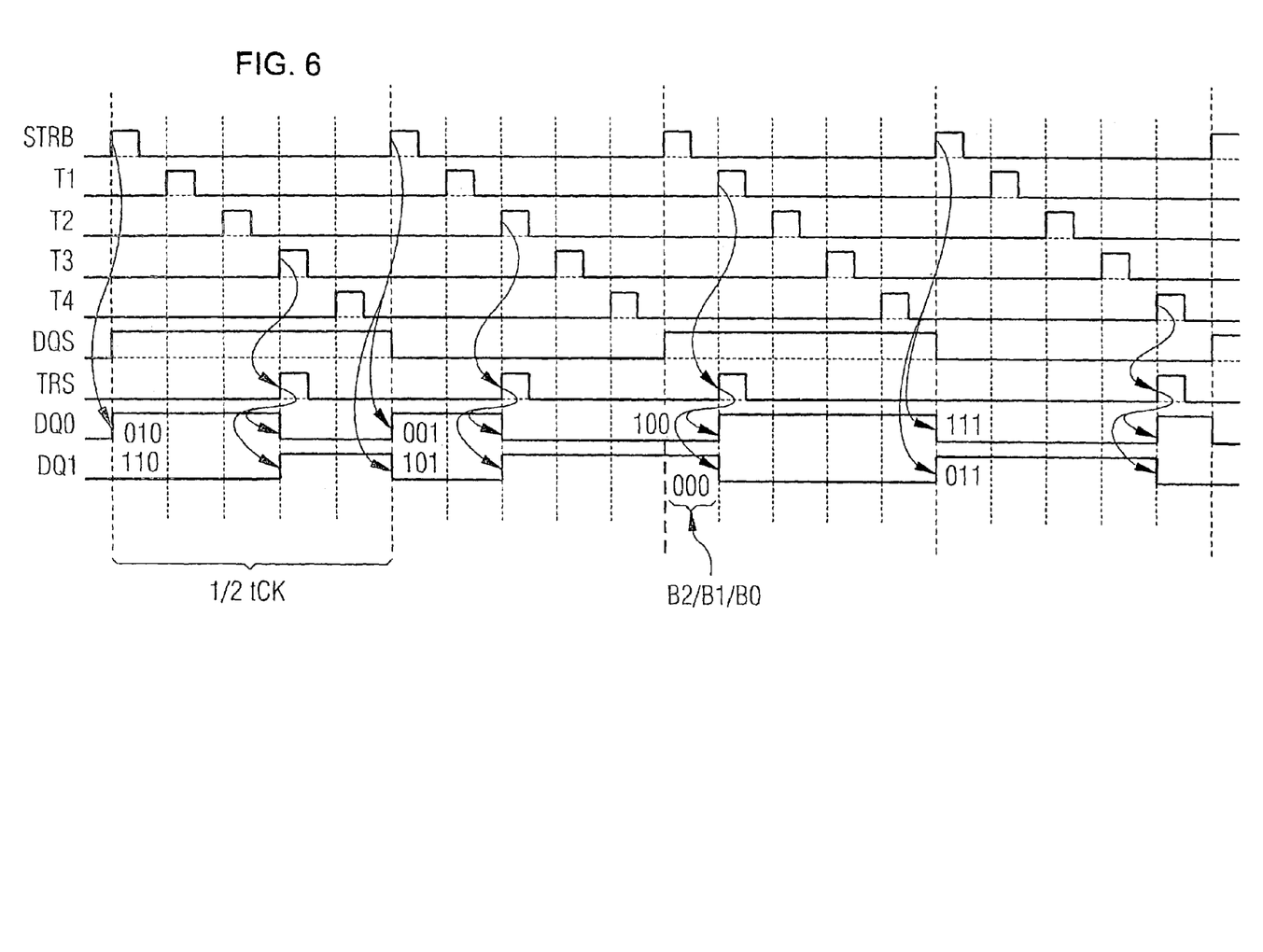
FIG. 6 shows an exemplary signal diagram during the operation of a modulation unit according to FIG. 5.

FIG. 6 shows an exemplary signal diagram during the operation of the modulation unit according to FIG. 5. The edges of the clock signals T1 to T4 are generated by the sequence controller 12 chronologically offset with respect to one another. The selection circuit 11 selects one of the clock signals T1 to T4 as a function of the information content or of the state of the binary signals B0, B1 and passes it on to the output of the selection circuit 11 for outputting of the signal TRS. In this way, as a function of the states of the binary signals B0, B1, pulse signals DQ0 and DQ1 are generated that differ in their pulse lengths. As a function of the state of the binary signal B2, the respective pulse signals are output in inverted or non-inverted form. This is clarified by the respective different signal profiles of the pulse signals DQ0 and DQ1 that are generated due to a different state of the binary signal B2. For example, in FIG. 6, the clock signal T3 is selected by the selection circuit 11 as a result of the state B1/B0=10 and is passed on to the output of the selection circuit 11 as a signal TRS. In a state B1/B0=01, the clock signal T2 is selected. The bit B2 is decisive for the signal level, that is to say, in this example for an inverted or non-inverted signal transmission.

Figure 7:
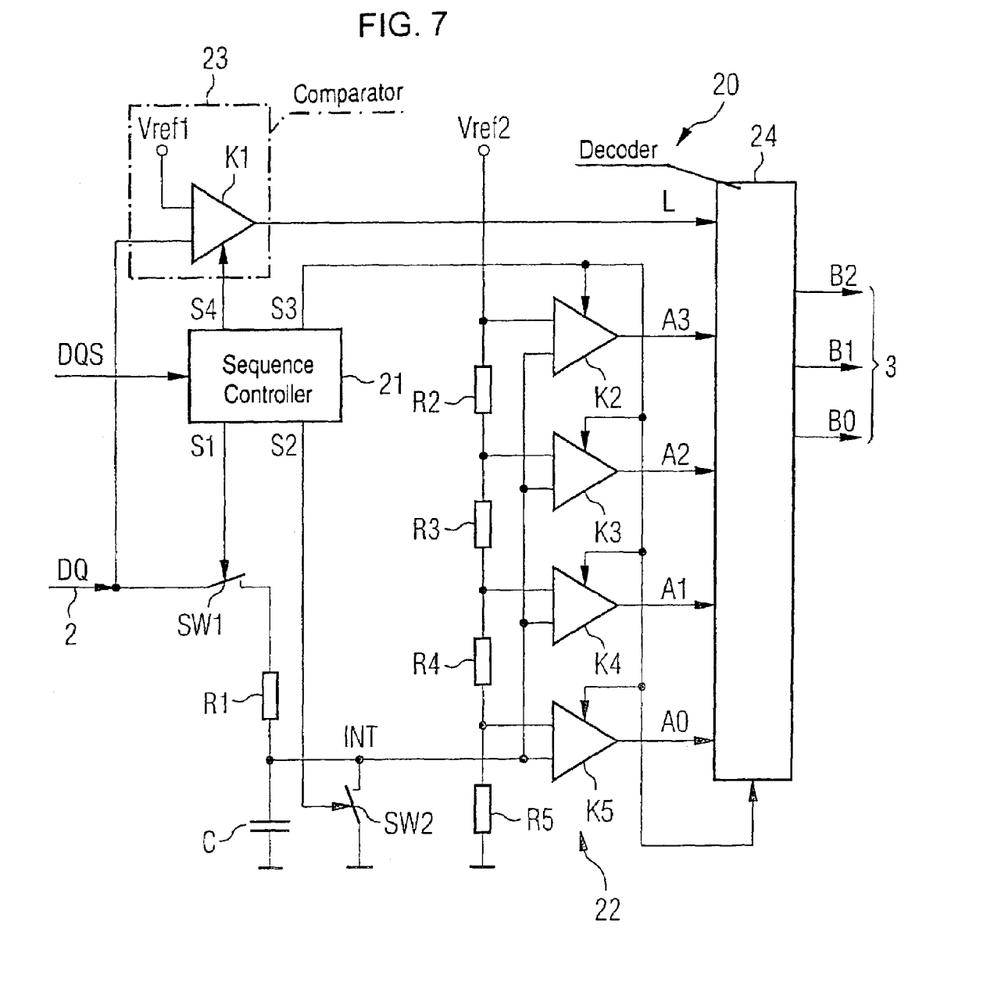
FIG. 7 shows an embodiment of a receiver unit according to the invention.

FIG. 7 shows an embodiment of a receiver unit 20 according to the invention. The receiver unit 20 has an integrator circuit that is formed in simplified form by the resistor R1 and the capacitor C. The integrator circuit is connected to the signal line 2 through a switch SW1. The integrated signal INT that is explained by FIGS. 2 or 3 can be tapped at the integrator circuit. The output of the integrator circuit with the signal INT can be connected to ground potential through a switch SW2.

A comparator circuit 22 with comparators K2 to K5 is provided for detecting the integrated signal INT. The latter has, in the present exemplary embodiment, a resistor series circuit of the resistors R2 to R5 that is connected to a terminal of a reference voltage source Vref2. Respective potentials of the individual resistors are tapped at the resistor series circuit and fed as reference potentials to respective comparators K2 to K5. The integrated signal INT is fed to the other respective inputs of the comparators K2 to K5. The comparator circuit 22 generates the output signals A0 to A3 that are fed to a decoder circuit 24. The decoder circuit 24 is used to decode binary signals B0 to B2 on signal line 3 from the output signals A0 to A3. An exemplary number of output signals A0 to A3 is shown here in FIG. 7, and this exemplary number can be varied correspondingly depending on the desired resolution of the decoding.

The receiver unit 20 also contains a sequence controller 21 for generating a number of control signals S1 to S3. A first control signal S1 serves to trigger an integration process through the switch SW1, a second control signal S2 serves to reset the integrator circuit through the switch SW2, and a third control signal S3 serves to activate, with signal edge control, the comparator circuit 22 and decoder circuit 24. Here, the switches SW1 and SW2 are activated and deactivated again by the voltage level of the respective control signals.

The receiver unit 20 contains a further comparator circuit 23 that serves to detect a signal level of pulses on the signal line 2. The comparator circuit 23 has a comparator K1. The comparator circuit 23 is necessary, in particular, for distinguishing inverted pulses from non-inverted pulses that are generated, for example, by a modulation unit according to FIGS. 5 and 6. The comparator circuit 23 is connected to a reference voltage source Vref1. The output signal L of the comparator circuit 23 is also fed to the decoder circuit 24 for the purpose of decoding binary signals. In addition, the sequence controller 21 has a fourth control signal S4 that serves to activate the comparator circuit 23.

Figure 8:
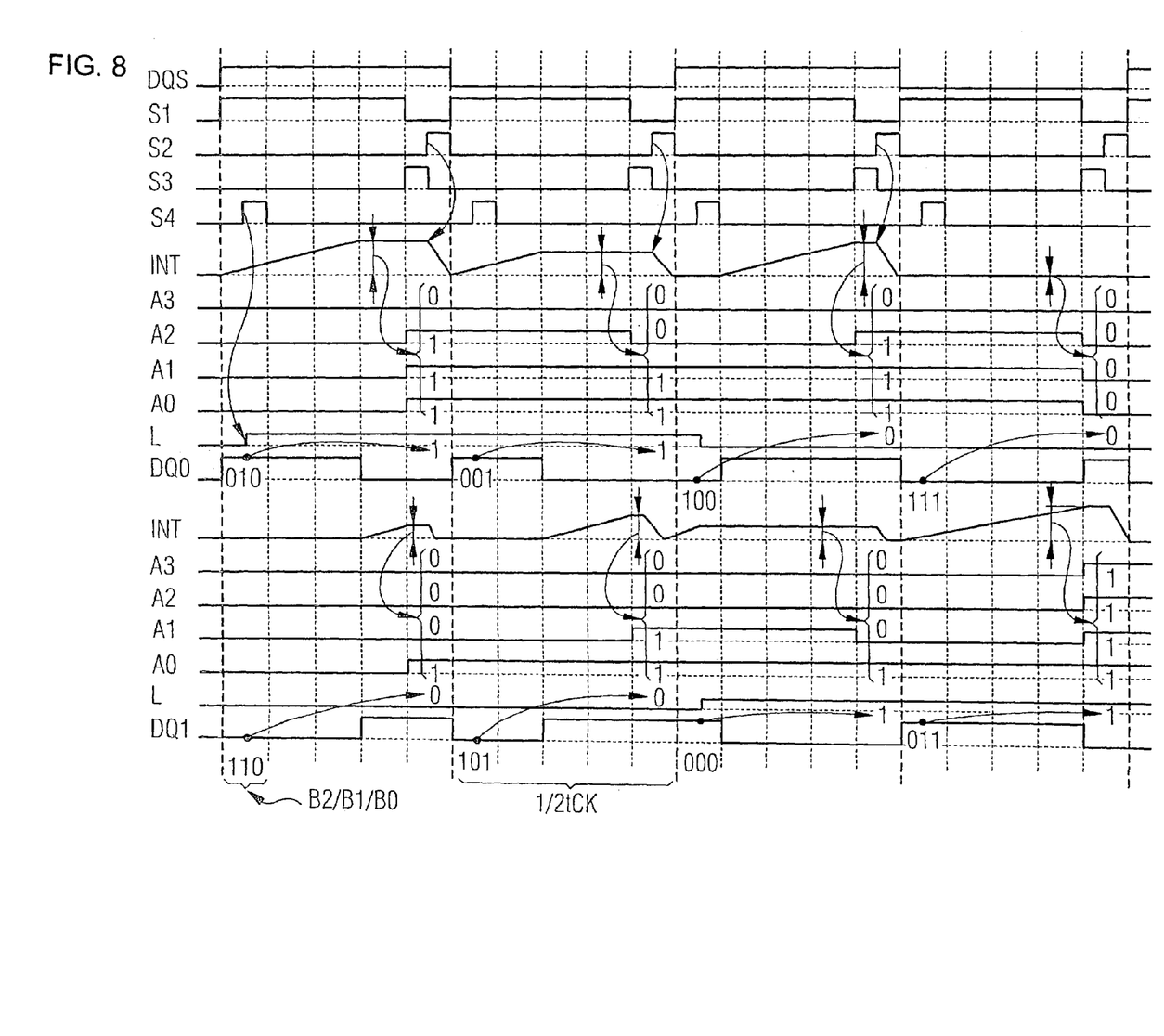
FIG. 8 shows an exemplary signal diagram during the operation of a receiver unit according to FIG. 7.

FIG. 8 shows an exemplary signal diagram during the operation of the receiver unit 20 according to FIG. 7. An integration process of the pulse signals DQ0 and DQ1 is triggered by the rising edge of the control signal S1. The control signal S4, the control signal S3, and the control signal S2 are, then, successively activated by the sequence controller after the control signal S1. The control signal S4 activates, with signal edge control, the comparator circuit 23 to detect the signal level of the respective pulse signal DQ0 or DQ1. The signal L correspondingly assumes the state 1 or 0. Depending on the respective pulse length of the pulse signals DQ0 and DQ1, the integrated signal INT assumes a different signal level. Depending on the signal level of the integrated signal INT, the output signals A0 to A3 of the comparator circuit 22 assume different combination states. The binary signals B0 to B2 are decoded from the signals A0 to A3 and L.

I claim:

1. A circuit configuration for transmitting digital signals, comprising:
   a first signal line for transmitting binary signals having states and information content;
   a second signal line;
   a terminal for supplying a setting signal;
   a modulation unit connected to said first signal line and to said second signal line, said modulation unit:
   transforming received binary signals into a series of pulses having respective pulse lengths and outputting the pulses to said second signal line;
   modulating the pulses in the pulse length as a function of the information content of the binary signals;
   varying a signal level of the pulses that are to be output to said second signal line as a function of a state of one of the binary signals;
   having a driver circuit connected to said second signal line for outputting the pulses to said second signal line, said driver circuit having:
   a setting input connected to said terminal; and
   a resetting input;
   a selection circuit connected to said first signal line, said selection circuit:
   having an output coupled to said resetting input;
   receiving a number of clock signals having edges being offset chronologically with respect to one another;
   receiving a number of the binary signals from said first signal line; and
   selecting one of the clock signals as a function of the information content of the number of binary signals to be passed onto said output of said selection circuit.

2. The circuit configuration according to claim 1, wherein:
   said modulation unit has a logic circuit component connected between said driver circuit and said output of said selection circuit;
   said logic circuit component is connected to said first signal line and is fed one of the binary signals; and
   said logic circuit component varies a signal level of the pulses that are to be output to said second signal line as a function of a state of one of the binary signals.

3. The circuit configuration according to claim 2, further comprising a receiver unit connected to said second signal line and receiving the pulses, said receiver unit respectively integrating the pulse signals over time to form an integrated signal and decoding at least one binary signal from the integrated signal.

4. The circuit configuration according to claim 3, wherein said receiver unit has:
   an integrator circuit connected to said second signal line and at which the integrated signal can be tapped;
   a comparator circuit for detecting the integrated signal, said comparator circuit supplying output signals;
   a decoder circuit connected to said comparator circuit for decoding binary signals from at least one of the output signals of said comparator circuit; and
   a sequence controller connected to said integrator circuit, said comparator circuit, and said decoder circuit, said sequence controller generating a number of control signals, a first of the control signals triggering an integration process, a second of the control signals resetting said integrator circuit, and a third of the control signals activating said comparator circuit and said decoder circuit.

5. The circuit configuration according to claim 4, wherein:
   said receiver unit has a second comparator circuit detecting a signal level of pulses on said second signal line and supplying an output signal;
   said decoder circuit is connected to said second comparator circuit and decodes binary signals from the output signal of said second comparator circuit; and said sequence controller is connected to said second comparator circuit and generates a fourth control signal activating said second comparator circuit.

6. The circuit configuration according to claim 5, wherein said sequence controller successively actuates the first control signal, the fourth control signal, the third control signal, and the second control signal for a decoding process.

7. The circuit configuration according to claim 4, further comprising:
   a terminal supplying a reference voltage;
   said comparator circuit having a resistor series circuit connected to said terminal, said resistor series circuit having resistors with potentials; and
   respective potentials of individual ones of said resistors being tapped at said resistor series circuit to serve as reference potentials of said comparator circuit.

8. The circuit configuration according to claim 3, wherein:
   said modulation unit has a terminal providing a data reference signal;
   said terminal of said modulation unit is connected to said receiver unit; and
   the data reference signal synchronizes said modulation unit and said receiver unit.

9. The circuit configuration according to claim 4, wherein:
   said modulation unit has a terminal providing a data reference signal; and said terminal of said modulation unit is connected to said sequence controller for synchronizing said modulation unit and said receiver unit with the data reference signal.

10. A method for transmitting digital signals, which comprises:
    providinq a modulation unit for transmitting digital signals by:
    transforming binary signals into a series of pulses;
    modulating the pulses in pulse length as a function of an information content of the binary signals;
    varying a signal level of the pulses as a function of a state of one of the binary signals;
    supplying a setting signal to the modulation unit;
    providing the modulation unit with a driver circuit outputting the pulses, the driver circuit having:
    a setting input influenced by the setting signal; and
    a resetting input;
    providing a selection circuit:
    having an output coupled to the resetting input;
    receiving a number of clock signals having edges being offset chronologically with respect to one another;
    receiving a number of the binary signals; and
    selecting one of the clock signals as a function of the information content of the number of binary signals to be passed onto the output of the selection circuit.

* * * * *